(No Model.) 5 Sheets—Sheet 4.

T. F. DOWNEY.
GAS METER.

No. 491,411. Patented Feb. 7, 1893.

WITNESSES
W. W. Bradford
T. Clough

INVENTOR
Thomas F. Downey
by Parker & Burton
Attorneys.

(No Model.) 5 Sheets—Sheet 5.

T. F. DOWNEY.
GAS METER.

No. 491,411. Patented Feb. 7, 1893.

WITNESSES
F. Clough
T. W. Bradford

INVENTOR
Thomas F. Downey
by Parker & Burton
Attorneys.

UNITED STATES PATENT OFFICE.

THOMAS F. DOWNEY, OF DETROIT, MICHIGAN.

GAS-METER.

SPECIFICATION forming part of Letters Patent No. 491,411, dated February 7, 1893.

Application filed August 12, 1892. Serial No. 442,940. (No model.)

*To all whom it may concern:*

Be it known that I, THOMAS F. DOWNEY, a citizen of the United States, residing at Detroit, county of Wayne, State of Michigan, have invented a certain new and useful Improvement in Gas-Meters; and I declare the following to be a full, clear, and exact description of the invention, such as will enable others skilled in the art to which it pertains to make and use the same, reference being had to the accompanying drawings, which form a part of this specification.

My invention relates to gas meters, and is especially designed to furnish a meter to be used under the relatively high pressures of natural gas, and it consists in certain principles of construction and combinations whereby gas is prevented from leaking into and through the indicator case, a common fault with dry meters, hereinafter fully described and claimed.

Figure 1:
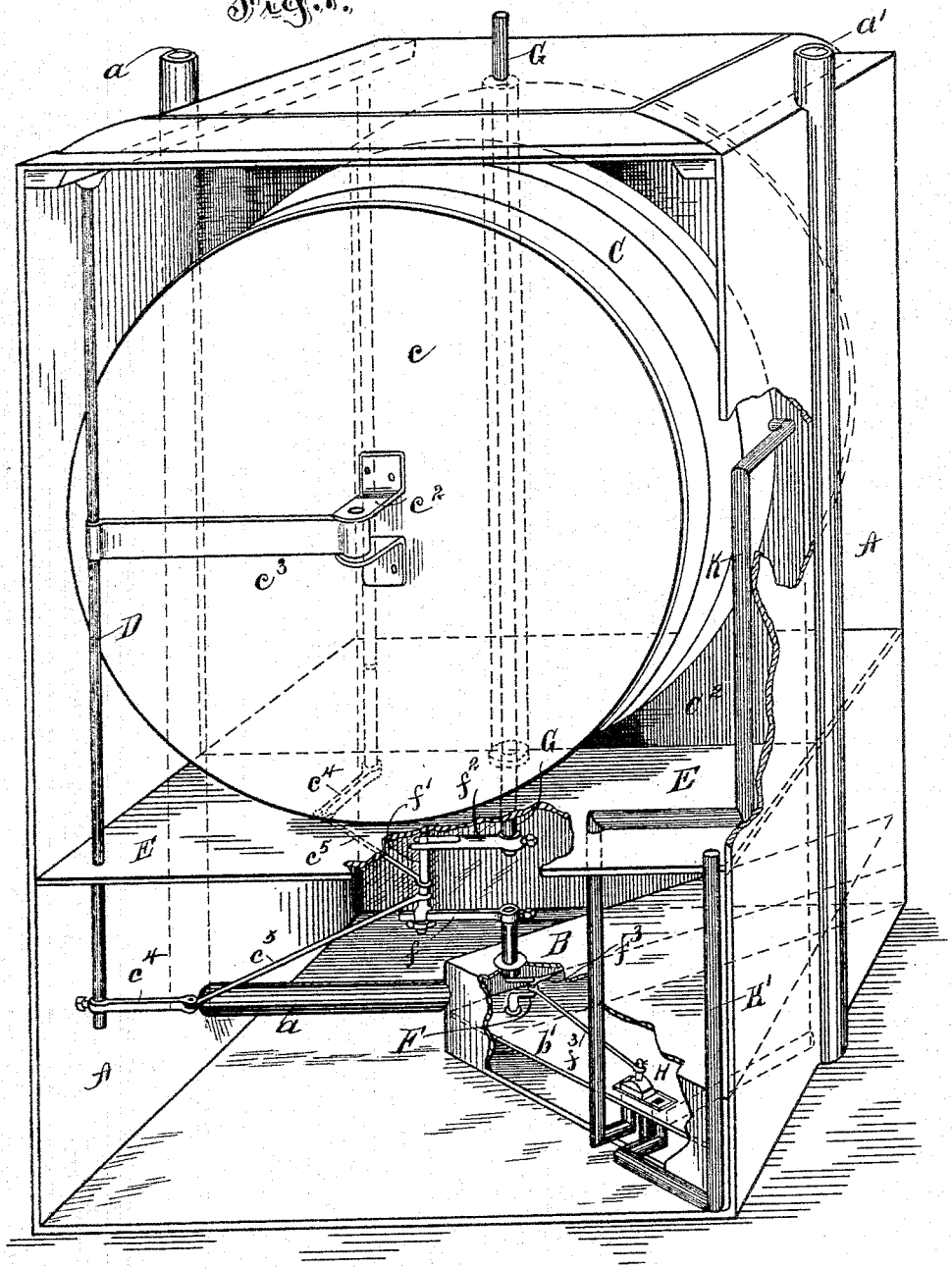
Figure 2:
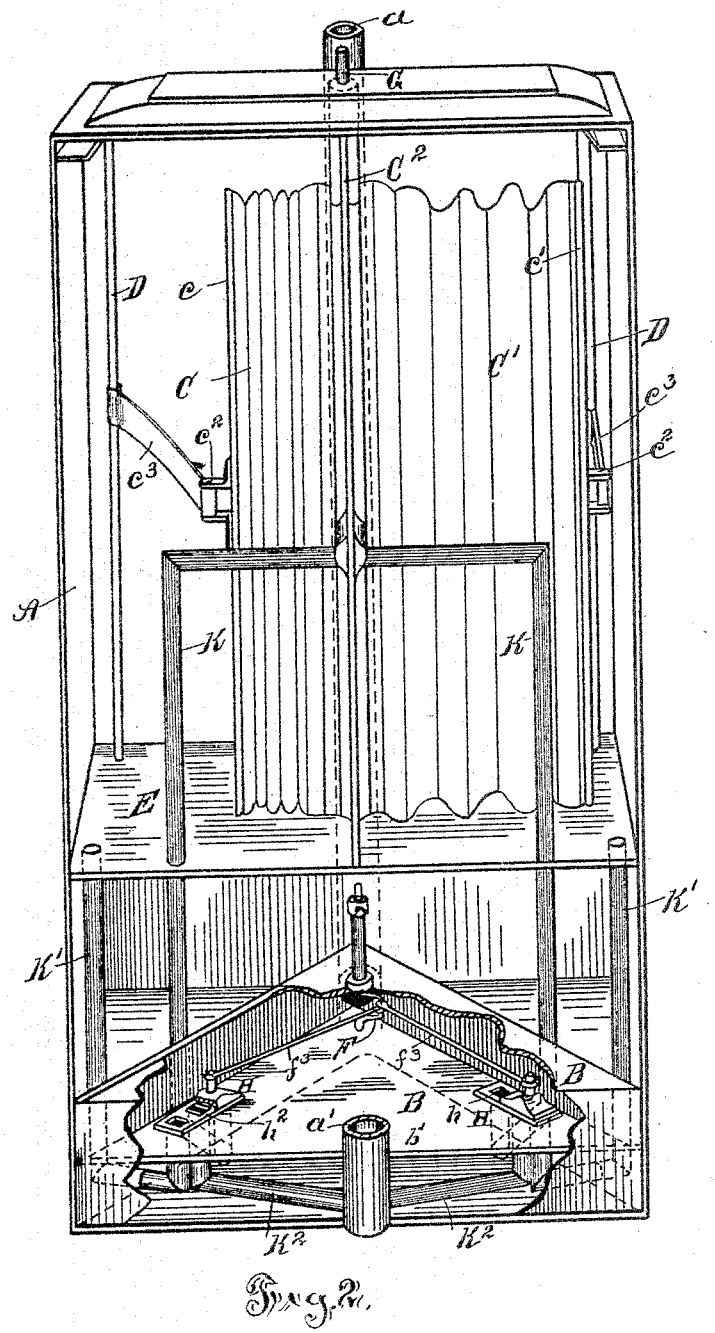
Figure 3:
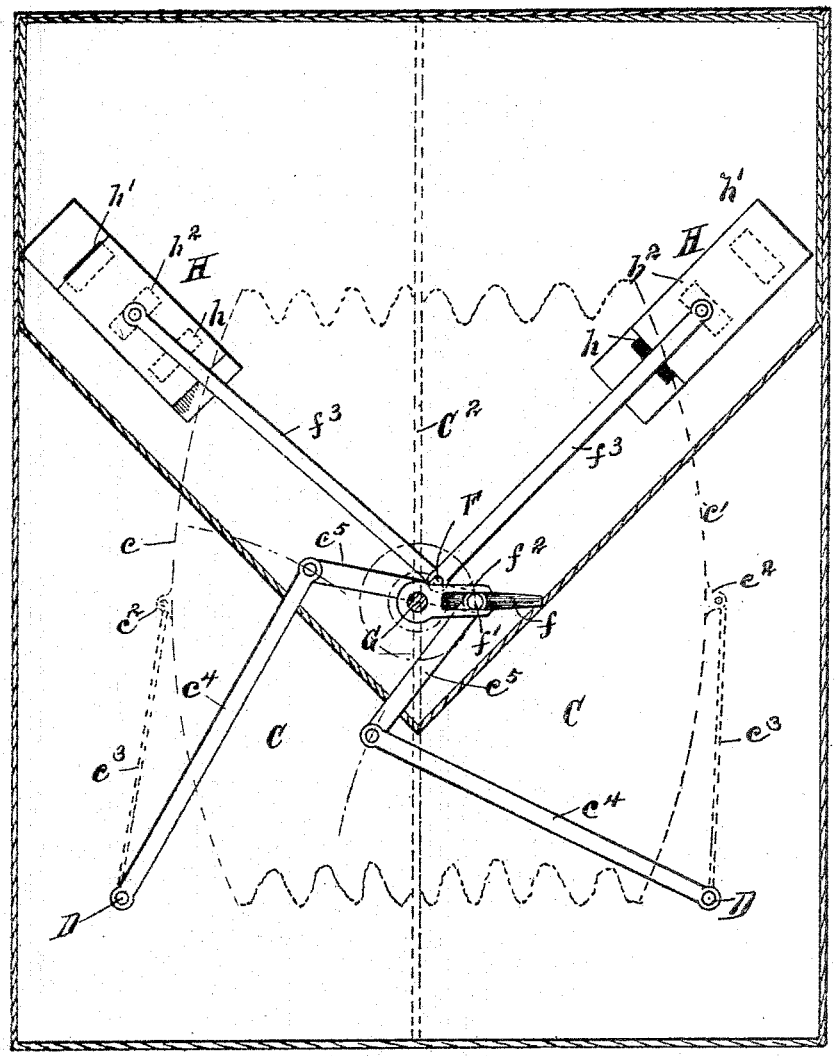
Figure 4:
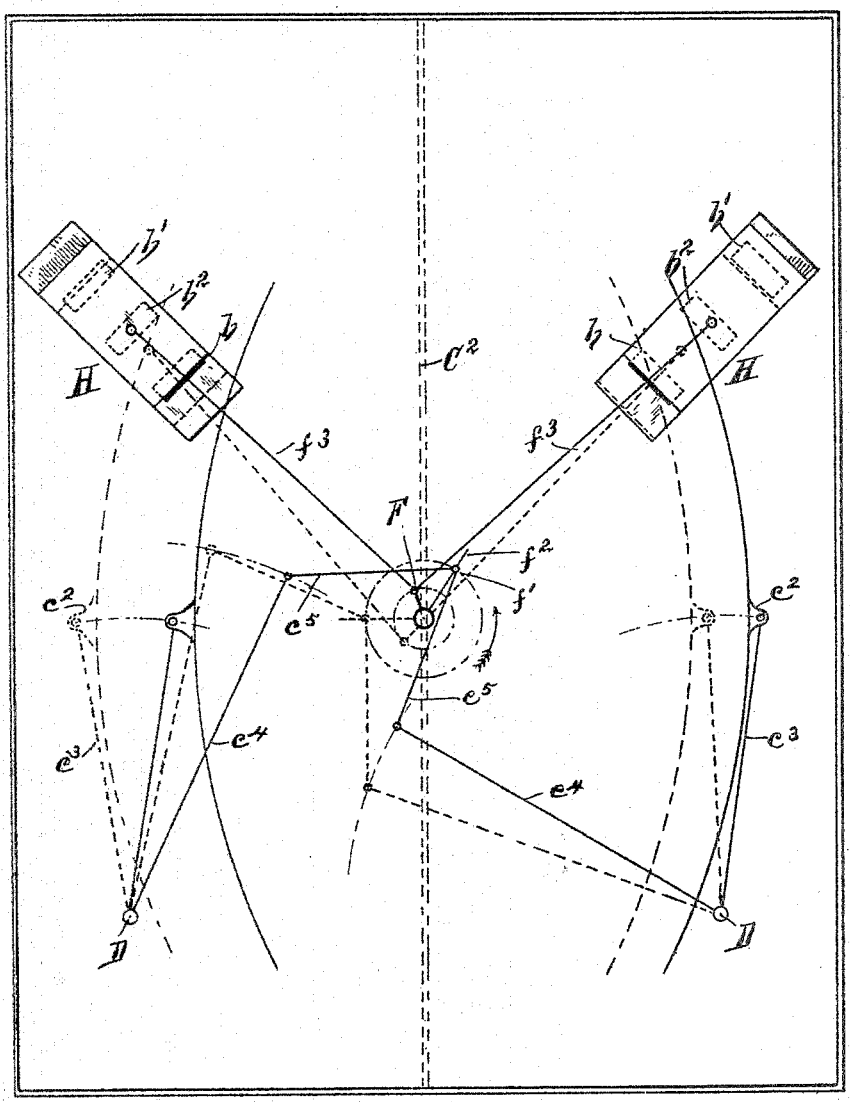
Figure 5:
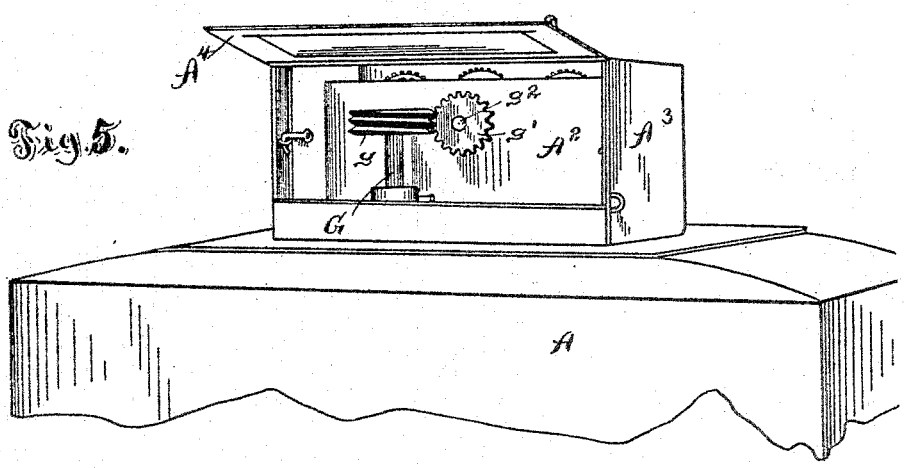
Figure 6:
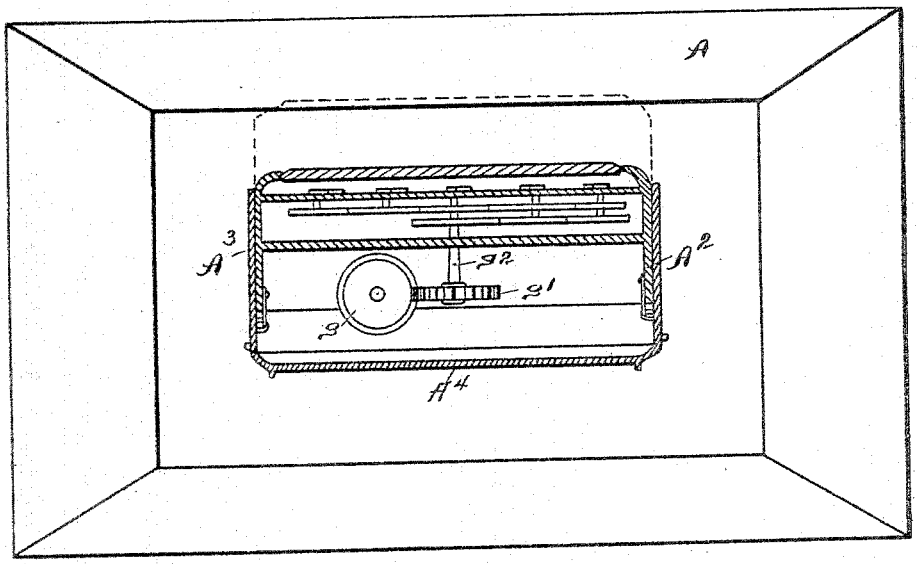

In the drawings, Figure 1 represents a perspective view of the interior of my improved meter, one side being removed for that purpose, and a portion of the exterior wall being also broken away, together with certain portions of the interior partitions, in order to more fully show the various arrangements and combinations of parts. Fig. 2 also represents an interior view of the meter looking from the right hand side of Fig. 1, that side being removed for the purpose of showing the interior arrangements, the top and side of the interior case being also broken away for the same purpose. Fig. 3 represents a plan view of the operating mechanism below the meter, the collapsible gas chambers being shown in dotted lines, together with connections from them to the rock shafts and arms operating the central shafts and the valves. Fig. 4 is a diagrammatical sketch of the same with the parts in slightly different positions, and intended to more fully illustrate the movements of the various operative parts, one of the collapsible gas chambers being shown extended to its greatest extent, and the other collapsed to its smallest compass, the dotted lines showing the reversal of the positions otherwise indicated. Fig. 5 is a perspective view illustrating the manner of attaching the dial indicating the amount of gas that is passing, and also the operative mechanism. Fig. 6 is a view of the same with the top removed.

In the drawings, similar characters refer to similar parts.

In the drawings, A represents the case inclosing the entire apparatus, with the exception of the outlet and inlet pipes.

$a$ represents the pipe leading from the generator to the meter, a portion of which is outside of the case A, and another portion of which is inside the meter and communicates with a triangular inclosure, the case of which is represented by B. This is shown broken away in both Figs. 1 and 2, to show the interior arrangement.

$a'$ is the discharge pipe to the burners, and through which the measured gas passes.

$C, C'$, are two bellows arranged upon opposite sides of a diaphragm or partition $C^2$, which prevents any communication from one to the other, and which also divides the interior of the case A into two gas tight compartments, in each of which is situated a bellows. The heads of the bellows respectively, $c, c'$, are constructed preferably of rigid material, and upon each of them are firmly attached brackets $c^2 c^2$, to which are pivoted radial arms $c^3 c^3$ operating rocker shafts D D. These shafts are located in two adjacent corners of the case A, and upon the side opposite to that of the triangular interior case B.

Below the bellows is located a horizontal partition E, which shuts off all of the lower portion of the device and its contained mechanism from the upper portion. The intermediate space above this partition E and inclosed in the case A, and in which are located the bellows C, C', forms the gas chamber. The bellows being gas tight, it is obvious that their expansion and contraction would serve to diminish and increase the amount of cubical capacity of the case A above the partition E, that is, outside of the bellows, in exact proportion to the expansion and contraction of the bellows. In the lower portion of the case A and below the partition E, as heretofore has been stated, is the case B, triangular in form, the base of the triangle being adjacent to the case A, and the apex of the triangle being fitted with the induction pipe $a$. This case is also gas tight, and in it is also arranged a secondary partition $b'$, dividing it into two, an upper and a lower part. In the apex of the case B and perpendicular to its partitions is located a crank shaft F, the bearings of which are gas tight in the partitions. The upper portion of this crank shaft F projects from the case B, and has fixed upon it a radial arm $f$. Adjustably attached to this radial arm is a perpendicular pin $f'$. At the lower portion of the rocker shafts D. D. there are attached rigidly by appropriate means secondary radial arms $c^4 c^4$, which are located below the horizontal partition E. The outer ends of these arms carry pitmen $c^5 c^5$, which engage with the pin $f'$. The upper portion of the pin $f'$ engages in a slot in a radial arm $f^2$, attached to a stem G, which passes up through a hole formed in the interior partition $C^2$. As the bearings therein are gas tight, this stem does not come in contact with gas, neither from the interior of the bellows, nor from the interior of the case A, and hence no gas is transmitted to the indicator case from either the bellows case or the valve case.

In the case B and attached to the crank shaft F are two valve rods $f^3$, $f^3$. These valve rods operate D valves H H. These valves are located upon seats constructed in the interior partition $b'$ and near the corners of the triangular case B adjacent to the casing A, as shown in Figs. 1 and 2. It is obvious, on a proper adjustment of the parts, that the respective reciprocations of the heads of the bellows C C' would reciprocate the rocker arms $c^3 c^3$ on the rock shafts D D, and that thereby the lower arms $c^4 c^4$, by means of the pitmen $c^5 c^5$, would operate the radial arm $f$, by means of the connections with the pin $f'$, and cause it to rotate. And the rotation of the radial arm $f$, turning the crank shaft F, would rotate the crank in the case B, and that, by means of the valve rods $f^3$, $f^3$, would thereby reciprocate the valves H H on their seats. The seats have each three ports, the valve being so constructed that two of them are in connection at the same time, while the third is open to the interior of the case B above the partition therein, $b'$.

K K are pipes communicating from the interior of each of the two bellows C and C'. They also communicate with the valve port $h$ $h$; the valve ports $h' h'$ communicate with pipes K' K', which communicate through the horizontal diaphragm E with the interior of the case above such diaphragm, as shown in Figs. 1 and 2. The center ports $h^2 h^2$, by means of pipes $K^2$, $K^2$, communicate with the discharge pipe $a'$. From this construction of the pipes, it is obvious that with one of the valves in the position shown in Fig. 1, there is communication from the interior of the bellows respectively through the pipes K K, under the D valves H H, through the eduction pipes $K^2 K^2$, and thence to the discharge pipe $a'$. The reversal of the valves, as shown in Fig. 1, would open free communication from the interior of the bellows through the pipes K K to the interior of the case B above the diaphragm $b'$, while there would be free communication from the case A above the horizontal diaphragm E, by means of the pipes K' K' through underneath the valves H H to the eduction pipes $K^2 K^2$ and discharge pipe $a'$.

In Fig. 3 a plan view of the mechanical arrangements is shown, and will be easily understood from the foregoing description.

In Fig. 4, is shown a diagrammatical view of the motions through which the mechanism passes, and showing the location of the valves in accordance with the respective pulsations of the bellows C, C', an arrow showing the direction in which the radial arm $f$ carrying the pin $f'$ rotates. This figure is mathematical in its character, and is purely illustrative, it being intended to show merely the relations of its parts in their operations.

The stem G extends upward through the top of the case A through a stuffing box, as is shown more particularly in Figs. 5 and 6, and carries at its upper end a screw worm wheel $g$. This wheel engages in a pinion $g'$, firmly attached to a horizontal shaft $g^2$, which extends into the interior of an indicator of the common form, the parts of which are therefore not described, but only indicated in Fig. 6, as they do not of themselves form any part of my invention herein described. The indicator, however, is inclosed in a case A', which is peculiar in its construction. It is formed in two parts, $A^2$, $A^3$, that portion of it marked $A^3$ being securely fastened to the top of the case A. The indicator proper is carried in the case $A^2$, and is intended to telescope into the interior and from the side of case $A^3$, and in which, when so telescoped, it may be firmly fastened by any appropriate means of fastening, as a hook, a staple, or otherwise, as shown in Fig. 5, and shown in plan in Fig. 6. The back of the case $A^3$ opens upwardly by a lid $A^4$, and which permits access to the worm wheel and pinion, and stuffing box at the upper end of the shaft G as shown more particularly in Fig. 5, in which the lid $A^4$ is hoisted. This may be fastened down by a lock, or it may be soldered firmly to the case $A^3$.

It is obvious that this form of construction permits ready access to the indicator, and also permits its ready removal in case it is desired to do so for purposes of repair or adjustment of the stuffing box surrounding the upper end of shaft G, without unsoldering the same from the case A, as is usual in dry meters. It is obvious that when so removed, it may be set at the zero point, and replaced, the pinion coming in contact with the worm wheel, as indicated in the drawings.

The mode of operation of this meter will be practically understood from the description heretofore given. I will state, however, that gas is admitted under the normal pressure into the pipe $a$. It at once passes into the case B above the horizontal partition $b'$. If the valve be properly adjusted, one of them being shown as in Fig. 1, the gas will pass through the port $h'$, and through the pipe $K'$, into the interior of the case A above the horizontal partition E. It thereupon, by its pressure, tends to collapse the bellows C. At the same time, the port $h$ of the opposite valve is open, and from thence the gas passes upward through the pipe K, which communicates with the bellows C' and tends to expand it. The movement of the contraction of the bellows C and the expansion of the bellows C' through the intermediate mechanism reverses the valves, and at the same time through the well known action of a D valve discharges the gas, on the one hand, from the interior of the case through the pipe $K^2$ to the discharge pipe $a'$, and, upon the other hand, from the interior of the bellows C' it is discharged through the center port and communicating pipes to the discharge pipe $a'$. At the same time, gas is admitted into the interior of the case A, in which the bellows C' is situated, and also into the interior of the bellows C, it being obvious that the two bellows respectively expand and contract simultaneously.

Heretofore it has been the practice to inclose the indicating mechanism within the casing of such meters where it was difficult of access. It was also difficult to get at the stuffing boxes of the shafts transmitting motion to the indicator. Either or both required unsoldering the case. In the use of artificial gas, the pressures are very moderate and the repairs were consequently so infrequently required that these defects were not particularly objectionable, but in the use of natural gas the pressure enormously exceeds that of artificial, which resulted in requiring frequent attention to be given to stuffing boxes and indicating connections, as there was enough spring to the cases to frequently derange connections. In order to render the parts readily accessible, it was necessary to place them outside of and on the casing; this could not be done on a flat unsupported side or end, because the spring of the side or end, either accidentally or under pressure, would derange the connections. The form I have devised supports the end or top on which the indicator is placed by means of the central diaphragm and its extension to and connection with the flat top. This is also further strengthened and braced by the tube through which the shaft G extends, it being formed in the partition and being connected to the flat top at its upper end. Thus, all the parts are rigidly secured together and permit the advantage of ready removal and access described which could not be secured with the old form.

What I claim is:—

1. In a gas meter, the combination with the upper wall thereof, of a transverse perpendicular diaphragm dividing the gas and bellows chamber into two parts, a tubular shaft well extending from a valve chamber below the gas chamber and formed within the perpendicular diaphragm connected to and opening through the upper wall, and an auxiliary detachable chamber containing indicating mechanism and connection, and located upon the upper wall, substantially as described.

2. In a gas meter, the combination of a chamber containing bellows and adapted to contain gas, a valve chamber adapted to receive and transmit gas, an intermediate chamber between the bellows chamber and the valve chamber containing the mechanism for operating the valves, from which gas is excluded, an upper chamber containing the indicator, and a tubular passage formed in a perpendicular diaphragm and connecting the upper and intermediate chambers, and a shaft located therein and connected at the lower end with the operating mechanism and at the other end with the indicator, substantially as described.

3. In a gas meter, in combination with the casing A, carrying shaft G, extending through its upper wall, an auxiliary case $A^3$ permanently connected to casing A, and surrounding the upper end of shaft G, one side of casing $A^3$ being detachable and carrying the indicating mechanism, and means for bringing the indicating mechanism into engagement with shaft G simultaneously with placing the detachable portion of casing A into position, substantially as described.

In testimony whereof I sign this specification in the presence of two witnesses.

THOMAS F. DOWNEY.

Witnesses:
CHARLES F. BURTON,
EFFIE I. CROFT.